United States Patent
Shaw

(10) Patent No.: US 10,893,171 B2
(45) Date of Patent: Jan. 12, 2021

(54) CORRECTIVE DATA FOR A RECONSTRUCTED TABLE

(71) Applicant: Hewlett-Packard Development Company, L.P., Spring, TX (US)

(72) Inventor: Mark Shaw, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/650,740

(22) PCT Filed: Oct. 10, 2017

(86) PCT No.: PCT/US2017/055886
§ 371 (c)(1),
(2) Date: Mar. 25, 2020

(87) PCT Pub. No.: WO2019/074487
PCT Pub. Date: Apr. 18, 2019

(65) Prior Publication Data
US 2020/0314288 A1    Oct. 1, 2020

(51) Int. Cl.
*H04N 1/60* (2006.01)

(52) U.S. Cl.
CPC ........... *H04N 1/603* (2013.01); *H04N 1/6008* (2013.01); *H04N 1/6058* (2013.01)

(58) Field of Classification Search
CPC .... H04N 1/603; H04N 1/6008; H04N 1/6058; H04N 1/60
See application file for complete search history.

(56) References Cited

U.S. PATENT DOCUMENTS

| | | |
|---|---|---|
| 6,535,631 B1 | 3/2003 | Mitsuhashi et al. |
| 7,663,781 B2 | 2/2010 | Song et al. |
| 2007/0097390 A1 | 5/2007 | Huang et al. |
| 2007/0196015 A1 | 8/2007 | Meunier |
| 2014/0258851 A1 | 9/2014 | Sesum |
| 2016/0154957 A1 | 6/2016 | Jeran et al. |
| 2017/0225475 A1 | 8/2017 | Nichols et al. |
| 2017/0230540 A1 | 8/2017 | Sasaki |

FOREIGN PATENT DOCUMENTS

| | | |
|---|---|---|
| EP | 2421241 A3 | 9/2013 |
| JP | 2008100471 A | 5/2008 |

OTHER PUBLICATIONS

Elliot, M.W. et al., Print Engine Color Management Using, Nov. 5, 2010, http://ieeexplore.ieee.org/document/5649758/ ~ 4 pages.

*Primary Examiner* — Christopher Wait
(74) *Attorney, Agent, or Firm* — Brooks Cameron & Huebsch PLLP

(57) ABSTRACT

The present application includes devices and methods for using corrective data for a reconstructed table. In some examples, a computing device can generate a key from a reconstructed table, determine corrective data for the reconstructed table based on the generated key, and implement the corrective data to the reconstructed table to generate an updated table.

15 Claims, 4 Drawing Sheets

CORRECTIVE DATA FOR A RECONSTRUCTED TABLE

BACKGROUND

Color management systems deliver a controlled conversion between color representations of various devices, such as image scanner, digital camera, computer monitors, printers, and corresponding media. Device profiles provide color management systems with information to convert color data between color spaces such as between native device color spaces and device-independent color spaces, between device-independent color spaces and native device color spaces, and between source device color spaces and directly to target device color spaces.

DETAILED DESCRIPTION

Figure 1:
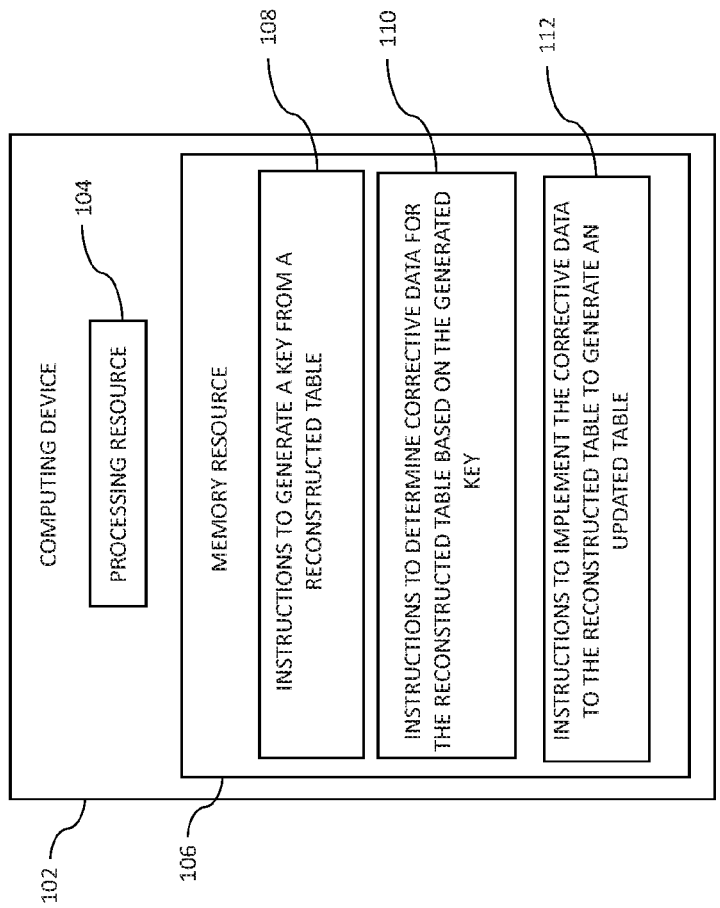
FIG. 1 illustrates a block diagram of an example of a computing device suitable for using corrective data for a reconstructed table consistent with the disclosure.

The present disclosure includes devices, methods, and machine-readable medium for using corrective data for a reconstructed table. In some examples, a computing device can generate a key from a reconstructed table, determine corrective data for the reconstructed table based on the generated key, and implement the corrective data to the reconstructed table to generate an updated table. The devices, methods, and machine-readable medium for using corrective data for a reconstructed table described herein can be utilized to alter a reconstructed color table using the corrective data. In this way, a color table or other type of table can be updated without updating the data used to generate the reconstructed table. Even though the present disclosure describes examples of color tables, other value tables can be utilized in a similar way.

As used herein, a color space can include a number of axes that describe a color plane numerically. Some output devices, such as printing devices, may employ a type of cyan-magenta-yellow-key (black) (CMYK) color space, while some software applications and display devices may employ a type of red-green-blue (RGB) color space. For example, a color represented in the CMYK color space has a cyan value, a magenta value, a yellow value, and a key (black) value that combined numerically represent the color.

A color profile can be a set of data that characterizes a color space. In one example, a color profile can describe the color attributes of a particular device or viewing specifications with a mapping between the device-dependent color space, such as a source or target color space, and a device-independent color space, such as profile connection space, and vice versa. The mappings may be specified using tables such as look up tables, to which interpolation is applied, or through a series of parameters for transformations. Devices and software programs (e.g., printers, monitors, televisions, operating systems, browsers, and other device and software, etc.) that capture or display color can include profiles that comprise various combinations of hardware and programming.

An International Color Consortium (ICC) profile is an example color profile that is a set of data that characterizes a color space according to standards promulgated by the ICC. Examples of this disclosure using ICC profiles, however, are for illustration only, and the description is applicable to other types of color profiles or color spaces. The ICC profile framework has been used as a standard to communicate and interchange between various color spaces. An ICC output profile includes color table pairs, so-called A2B and B2A color look up tables, where A and B denote the device-dependent and the device-independent color spaces, respectively.

For different devices, there can be a different look up table rendering intents. For example, an ICC profile allows for four color table intents, enumerated from 0 to 3, enabling the user to choose from one of the four possible rendering intents: absolute colorimetric, relative colorimetric, perceptual, or saturation. ICC profiles are often embedded in color documents as various combinations of hardware and programming to achieve color fidelity between different devices, which increases the total size of these documents.

The size of color tables can also increase with finer sampling of the spaces and larger bit depths. Color tables that provide transformations between various color spaces are extensively used in color management, common examples being the transformations from device independent color spaces (e.g., CIELAB, mathematically describes perceivable colors three dimensions, etc.) to device dependent color spaces (such as RGB or CMYK) and vice versa. For devices such as color printers, the color tables are often embedded in the printer firmware or other hardware, where the color tables consume computer memory in storage devices. In some scenarios, the amount of firmware memory consumed for storing these color tables can become a problem, particularly as the number of the look up tables in color devices increases to support multiple color spaces, print media, and preferences. The trend toward finer sampling of the spaces and larger bit depths also results in an increase in table sizes, further exacerbating these memory concerns.

In some examples, a reconstructed color table can be decompressed or generated utilizing printer functional data (PFD) and seed data (e.g., a bit assignment table (BAT), etc.). In some examples, the reconstructed color table can be utilized to generate a number of keys. For example, the reconstructed color table can be hashed (e.g., a hash function performed on the reconstructed color table, etc.) to generate a unique key or unique identifier that represents a particular color plane of the color table. In some examples, the generated key can be compared to a plurality of keys stored in a key repository. When the generated key matches a key in the key repository, it can be determined that the reconstructed color table includes correction data to be applied to the reconstructed color table.

Thus, the reconstructed color table is updated by the correction data without having to update the PFD or the BAT. In addition, the PFD and BAT can be updated and an additional key with corresponding correction data can be implemented within the key repository. This can be utilized to resolve having to update the BAT on the computing device or printing device, which may use additional memory sources of the firmware or hardware.

FIG. 1 illustrates a block diagram of an example of a computing device 102 suitable for using corrective data for a reconstructed table consistent with the disclosure. In some examples, the computing device 102 can be a printing device or computing device coupled to a printing device. The computing device 102 can include a processing resource 104 and a memory resource 106 (e.g., machine readable storage medium, non-transitory machine-readable storage medium, etc.). Memory resource 106 can include machine readable instructions, including generation instructions 108, corrective data instructions 110, and/or updating instructions 112.

Processing resource 104 may be a central processing unit (CPU), a semiconductor based microprocessor, and/or other hardware devices suitable for retrieval and execution of machine-readable instructions 108, 110, 112 stored in a memory resource 106. Processing resource 104 may fetch, decode, and execute instructions 108, 110, 112. As an alternative or in addition to retrieving and executing instructions 108, 110, 112 processing resource 104 may include a plurality of electronic circuits that include electronic components for performing the functionality of instructions 108, 110, 112.

Memory resource 106 may be any electronic, magnetic, optical, or other physical storage device that stores executable instructions 108, 110, 112 and/or data. Thus, memory resource 106 may be, for example, Random Access Memory (RAM), an Electrically-Erasable Programmable Read-Only Memory (EEPROM), a storage drive, an optical disc, and the like. Memory resource 106 may be disposed within the computing device 102, as shown in FIG. 1. Additionally, and/or alternatively, memory resource 106 may be a portable, external or remote storage medium, for example, that allows the computing device 102 to download the instructions 108, 110, 112 from the portable/external/remote storage medium.

Processing resource 104 may execute generation instructions 108 stored in memory resource 106 to generate a key from a reconstructed table (e.g., color table, multi-dimensional format table, halftone table, planar table, etc.). In some examples, the reconstructed table can be a table of data that can be represented by a plurality of numerical blocks organized in rows and columns. In some examples, the generation instructions 108 can include instructions to generate the reconstructed table. In some examples, the generation instructions 108 can include instructions to generate the reconstructed table from Printer Functional Data (PFD) and printing device information. For example, a particular printing device can have specific information (e.g., settings, configurations, etc.) that can alter performance of the printing device. In this example, a reconstructed color table can be device specific and utilize the specific information when generating the reconstructed color table. In some examples, generating the reconstructed table can include generating a reconstructed color table utilizing PFD and seed data (e.g., bit assignment table (BAT), etc.).

In some examples, the reconstructed table can be a table reconstructed from a compressed color table. For example, the compressed color table can be an original color table compressed with a lossy compression or lossless compression at a selected compression ratio. The compressed color table can include a color difference between an original node of the color table and the corresponding reconstructed node of the compressed color table that is within a selected error threshold at the selected compression ratio.

In some examples, the reconstructed color table can include a quantity of errors based on the selected error threshold. In some examples, the quantity of errors can be corrected utilizing seed data (e.g., a bit assignment table, a coefficient bit assignment table, etc.). For example, nodes of the original color table can be transformed with a lossy compression to obtain quantized coefficients. The quantized coefficients can be reordered into a one-dimensional bitstream using a multi-dimensional reordering, such as a three-dimensional zigzag ordering. A coefficient bit assignment table can be calculated from the quantized coefficients. The coefficient bit assignment table can be applied to the quantized coefficients to reconstruct the coefficients in decompression to generate the reconstructed color table. The quantized coefficients and the coefficient bit assignment table are stored as a bitstream on a memory device. The quantized coefficients can be reordered into a one-dimensional bitstream using a multi-dimensional reordering, such as a three-dimensional zigzag ordering, which can introduce a large amount of redundancy to the coefficient bit assignment table. The coefficient bit assignment table and the lossy compressed coefficients can be further compressed with the lossless compression that can be written to a binary file on the memory device.

Lossless compression and lossy compression are forms of data compression, which includes encoding information using fewer bits than the original representation. In lossless compression, no digital difference exists between the original data and the reconstructed compressed data. In lossy compression, a portion of the original data is lost upon reconstruction of the compressed data.

In some examples, the decompression of the lossy compressed table or generation of the reconstructed table can be utilized to generate a key that can be compared to keys of a key repository to determine if there is corrective data that corresponds to the reconstructed table. For example, a hash function can be performed on the reconstructed table to generate a key value that can represent a state of the reconstructed table. In this example, the state of the reconstructed table can correspond to a quantity of changes or alterations that may affect an effectiveness of the reconstructed table. For example, the PFD may be incorrect or include a number of errors. In this example, state of the reconstructed table from the PFD can include a number of errors that can be altered utilizing corrective data as described further herein.

As described herein, the generation instructions 108 can include instructions to determine when an error exists in the reconstructed table based on a comparison between the generated key and a number of keys within a key repository. For example, the generated key from the reconstructed table can be compared to a plurality of keys stored in a key repository. In this example, a matching key in the key repository can indicate that corrective data is available for the reconstructed table. As described further herein, the corrective data can alter values of the reconstructed table when the generated key matches one of the number of keys within the key repository. In addition, the corrective data corresponds to the key of the number of keys within the key repository that matches the generated key.

Processing resource 104 may execute corrective data instructions 110 stored in memory resource 106 to determine corrective data for the reconstructed table based on the generated key. As described herein, a key repository can include a plurality of keys with corresponding corrective data that can be applied to a particular reconstructed table. In some examples, a hash function can be performed on a reconstructed table to generate a unique key for the reconstructed table. The unique key for the reconstructed table can be compared to the plurality of keys of the key repository.

When the unique key for the reconstructed table matches a key of the key repository the corresponding corrective data from the key repository can be utilized to alter the reconstructed table.

In some examples, the corrective data can include delta values to increase or decrease a number of values of the reconstructed table. For example, the reconstructed table can be a reconstructed color table that includes a plurality of values that can be utilized as a color look up table. In this example, a number of the values can be altered by a particular quantity via the corrective data. In some examples, the corrective data can be in the same format as the reconstructed table to alter each of the values of the reconstructed table by a particular delta value (e.g., 0, +1, +2, −1, −1, etc.).

Processing resource 104 may execute updating instructions 112 stored in memory resource 106 to implement the corrective data to the reconstructed table to generate an updated table. As described herein, the corrective data can include a plurality of delta values that can be implemented into the reconstructed table by altering the values of the reconstructed table by the delta values. In some examples, the updated table can be transmitted to an application for a plurality of uses. For example, the updated table can be transmitted to a profile build (e.g., ICC profile builder, etc.) to generate a color profile based on the updated table.

In some examples, the computing device 102 can be utilized to update a reconstructed table without having to update the PFD or the BAT. In previous systems, updating the PFD or the BAT can be expensive and create multiple versions of the PFD and/or BAT on the same model device. The multiple versions can also create problems. For example, a first version can be a version with errors that were updated in a second version. In this example, the first version may need to be corrected or updated, but the second version may not need to be corrected or updated. In this example, the computing device 102 may need to identify which version of the PFD or the BAT that is being utilized to determine if or when updating is needed. Thus, the computing device 102 can update the reconstructed table without updating the PFD or the BAT prior to the reconstructed table being sent to an application for use.

Figure 2:
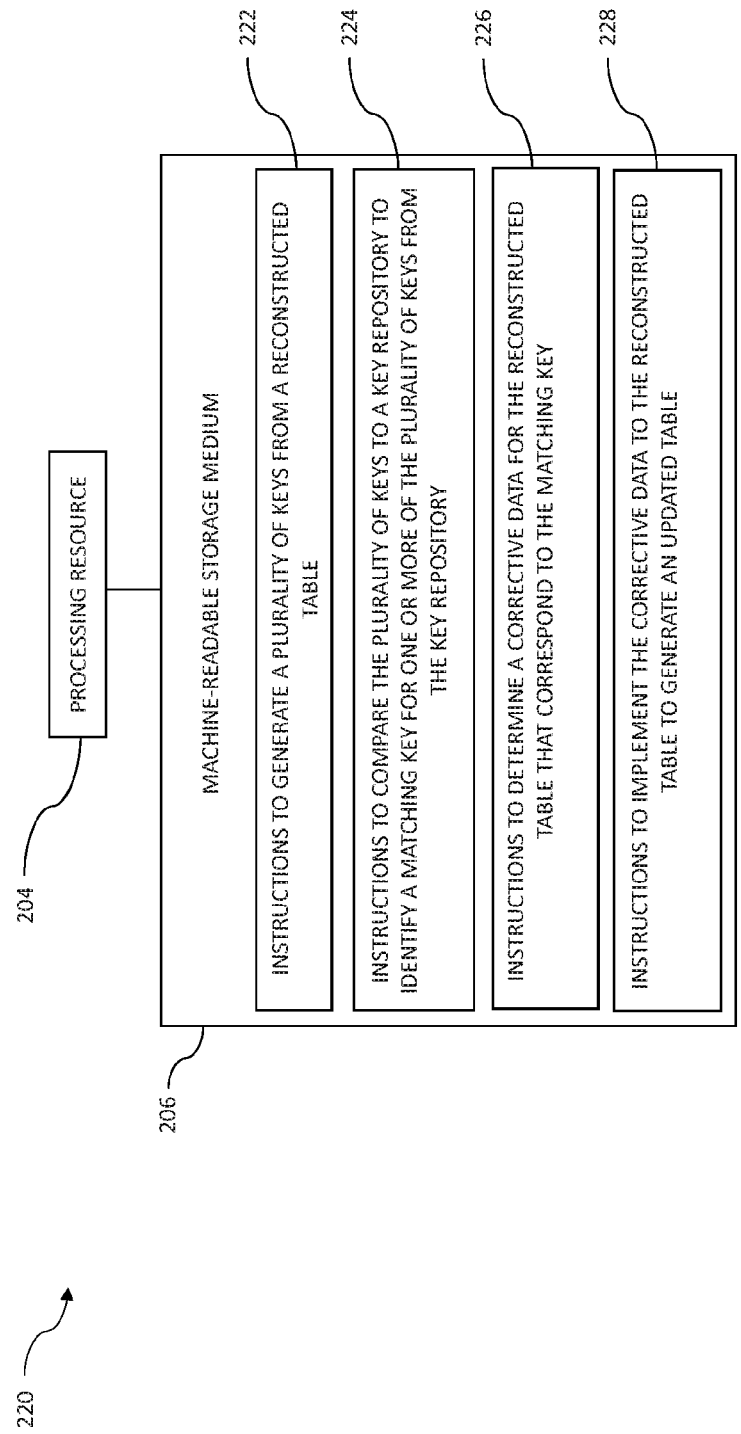
FIG. 2 illustrates a block diagram of an example of a system suitable for using corrective data for a reconstructed table consistent with the disclosure.

FIG. 2 illustrates a block diagram of an example of a system 220 suitable for using corrective data for a reconstructed table consistent with the disclosure. The system 220 can include a processing resource 204 and a memory resource 206. Memory resource 206 can include machine readable instructions such as instructions 222, instructions 224, instructions 226, and/or instructions 228.

Processing resource 204 may be a central processing unit (CPU), a semiconductor based microprocessor, and/or other hardware devices suitable for retrieval and execution of machine-readable instructions 222, 224, 226, 228 stored in a memory resource 206. Processing resource 204 may fetch, decode, and execute instructions 222, 224, 226, 228. As an alternative or in addition to retrieving and executing instructions 222, 224, 226, 228 processing resource 204 may include a plurality of electronic circuits that include electronic components for performing the functionality of instructions 222, 224, 226, 228.

Memory resource 206 may be any electronic, magnetic, optical, or other physical storage device that stores executable instructions 222, 224, 226, 228 and/or data. Thus, memory resource 206 may be, for example, Random Access Memory (RAM), an Electrically-Erasable Programmable Read-Only Memory (EEPROM), a storage drive, an optical disc, and the like. Memory resource 206 may be disposed within a device. Additionally, and/or alternatively, memory resource 206 may be a portable, external or remote storage medium, for example, that allows the system 220 to download the instructions 222, 224, 226, 228 the portable/external/remote storage medium.

Processing resource 204 may execute instructions 222 stored in memory resource 206 to generate a plurality of keys from a reconstructed table. As described herein, a key can be generated from a reconstructed table by applying a hash function on the reconstructed table to generate a unique key that corresponds to the reconstructed table.

In some examples, the reconstructed table can represent a plurality of planes. For example, a reconstructed color table can represent a plurality of planes for a plurality of colors. In this example, the plurality of planes can correspond to a color space as described herein. For example, a particular mode of a printing device can be a process neutral (PN) mode, a key only (KN) mode, combination of PN and KN on a single page of print media, and/or a different type of mode. In this example, each of the color spaces (e.g., cyan, magenta, yellow, key, etc.) of a particular mode can have a corresponding key generated as described herein. The present disclosure describes a PN mode and a KN mode, but a plurality of additional modes can be utilized. For example, the plurality of modes can include a PN mode, a KN mode, and/or a mode that is dependent on the color separation, media, toner limits, and/or ink limits of the system.

In some examples, the instructions 222 can include instructions to identify a first set of keys for the reconstructed table for a first mode, identify a second set of keys for the reconstructed table for a second mode, and/or compare each of the first set of keys and the second set of keys to the plurality of keys from the key repository. In some examples, the first mode can be a PN mode and the second mode can be a KN mode.

As described herein, the PN mode and the KN mode can, in some examples, be performed on the same sheet of print media. In some examples, the PN mode can include four keys that represent cyan, magenta, yellow, and key (black) in the PN mode and the KN mode can include four keys that represent cyan, magenta, yellow, and key (black) in the KN mode. In some examples, the first set of keys can correspond to corrective data for the reconstructed table when a printing device is in the first mode and the second set of keys can correspond to corrective data for the reconstructed table when the printing device is in the second mode. As described herein, the first mode and the second mode can be utilized for a single page of print media.

Processing resource 204 may execute instructions 224 stored in memory resource 206 to compare the plurality of keys to a key repository to identify a matching key for one or more of the plurality of keys from the key repository. As described herein, the plurality of keys generated based on the reconstructed table can be compared to a plurality of keys of the key repository. In some examples, the key repository can include a plurality of keys and corresponding corrective data for updating particular reconstructed tables. In some examples, the key repository can be updated with new keys and corresponding corrective data. For example, a key that matches a key for a particular reconstructed table can be added to the key repository with corresponding corrective data to update the particular reconstructed table. Thus, the key repository can be updated in a memory resource to reflect updated changes or alterations for the particular reconstructed table.

Processing resource 204 may execute instructions 226 stored in memory resource 206 to determine corrective data for the reconstructed table that correspond to the matching key. As described herein, the corrective data can include a plurality of delta values that can be implemented into the reconstructed table to update the reconstructed table. For example, the plurality of data values can be utilized to alter the values of the reconstructed table. In some examples, the corrective data can be stored with a corresponding key in the key repository.

Processing resource 204 may execute instructions 228 stored in memory resource 206 to implement the corrective data to the reconstructed table to generate an updated table. As described herein, the corrective data can include a plurality of delta values that can represent alterations for each of a plurality of values of the reconstructed table. The plurality of delta values can include a plus/minus value for a corresponding location of the reconstructed table. For example, the plurality of delta values can represent a quantity of alteration for a corresponding row and column of the reconstructed table.

As described herein, the system 220 can be utilized to alter a reconstructed table without updating data utilized to decompress the reconstructed table. In some examples, the key repository can be updated to alter an updated reconstructed table without having to alter the data utilized to decompress the reconstructed table. For example, the correction data that corresponds to the keys in the key repository can be altered to update the correction data utilized when the key matches a key generated from the reconstructed table.

Figure 3:
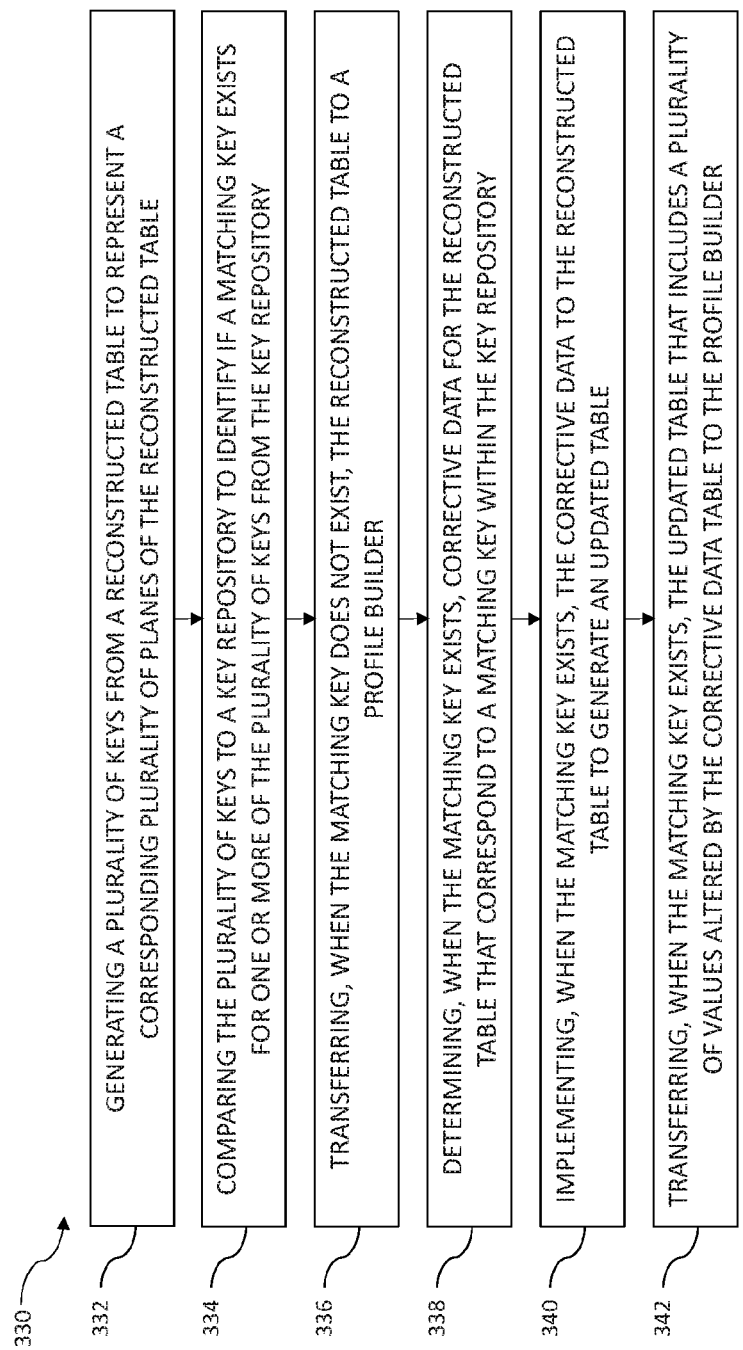
FIG. 3 illustrates an example of a method for using corrective data for a reconstructed table consistent with the disclosure.

FIG. 3 illustrates an example of a method 330 for using corrective data for a reconstructed table consistent with the disclosure. In some examples, the method 330 can be executed by a computing device (e.g., computing device 102 as referenced in FIG. 1, system 220 as referenced in FIG. 2, etc.). In some examples, the method 330 can be utilized update the reconstructed table with corrective data by generating a key based on the reconstructed table to identify corrective data to be utilized for the reconstructed table.

At 332 the method 330 can include generating a plurality of keys from a reconstructed table to represent a corresponding plurality of planes of the reconstructed table. As described herein, the plurality of keys can be generated with a hash function for each of a plurality of planes of the reconstructed table. For example, generating the plurality of keys from the reconstructed table can include utilizing a hash function on the values of the reconstructed table to generate a hashed reconstructed table. The generated key or hashed reconstructed table can be a unique identifier for the reconstructed table and/or for a corresponding plane of the reconstructed table. As described herein, the plurality of planes can correspond to color planes of a printing mode (e.g., PN mode, KN mode, combination of PN mode and KN mode, etc.).

In some examples, the PN mode can include four keys that represent cyan, magenta, yellow, and key (black) in the PN mode and the KN mode can include four keys that represent cyan, magenta, yellow, and key (black) in the KN mode. In some examples, the first set of keys can correspond to corrective data for the reconstructed table when a printing device is in the first mode and the second set of keys can correspond to corrective data for the reconstructed table when the printing device is in the second mode. As described herein, the first mode and the second mode can be utilized for a single page of print media.

At 334 the method 330 can include comparing the plurality of keys to a key repository to identify if a matching key exists for one or more of the plurality of keys from the key repository. Comparing the plurality of keys generated from the plurality of planes of the reconstructed table can include comparing each of the plurality of keys to keys stored in a key repository. As described herein, the plurality of keys in the key repository can correspond to corrective data for a particular plane of the reconstructed table. For example, a generated key from the plurality of keys can match a key in the key repository that corresponds to corrective data that can be implemented in the reconstructed table and/or to a particular plane of the reconstructed table.

At 336 the method 330 can include transferring, when the matching key does not exist, the reconstructed table to a profile builder. In some examples, the plurality of keys generated by the reconstructed table may not match a key within the key repository. For example, the reconstructed table may not need any additional update or include errors to be corrected by corrective data. In some examples, the key repository can include only keys that correspond to reconstructed tables that need an update or include an error.

In some examples, the key repository can include keys that correspond to corrective data that does not include delta values. For example, a matching key can exist for a key generated by a reconstructed table that does not need altered values to be implemented by corrective data. In this example, the corrective data can include only zeros such that the values of the reconstructed table are not altered when the corrective data is implemented. In some examples, a key and corresponding corrective data may not exist within the key repository. In these examples, the method 330 can skip implementing the corrective data and the reconstructed table can be transferred to an application or profile builder as a finalized reconstructed table.

At 338 the method 330 can include determining, when the matching key exists, corrective data for the reconstructed table that correspond to a matching key within the key repository. As described herein, determining corrective data for the reconstructed table can include identifying corresponding corrective data stored with a matching key from the key repository. As described herein, the corrective data can include a plurality of delta values that can be utilized to alter a plurality of values from the reconstructed table. For example, the plurality of delta values can indicate a quantity change for each of the plurality of values for the reconstructed table. As described herein, the key repository can include a plurality of key values that correspond to hashed reconstructed tables to be altered by corresponding corrective data. That is, each of the plurality of keys stored in the key repository can be hashed reconstructed tables that are identified to need corresponding corrective data. In some examples, the corrective data can be stored with the corresponding key in the key repository.

At 340 the method 330 can include implementing, when the matching key exists, the corrective data to the reconstructed table to generate an updated table. As described herein, the corrective data can be implemented into the reconstructed table by altering the values of the reconstructed table based on the delta values of the corrective data. In some examples, the corrective data can be in the same or similar format as the reconstructed table. For example, the reconstructed table can include a plurality of values in a multi-dimensional format. In this example, the corrective data can include a plurality of delta values in the same or similar multi-dimensional format to instruct the value and location of the value to alter by the delta value.

When the values of the multi-dimensional format of the reconstructed table are altered by the delta values, an updated table can be generated. The updated table can be in the same format of the reconstructed table with altered values. In some examples, a first portion of the values of the reconstructed table are altered and a second portion of the values of the reconstructed table are not altered or altered by a delta value of zero.

At 342 the method 330 can include transferring, when the matching key exists, the updated table that includes a plurality of values altered by the corrective data table to the profile builder. In some examples, the updated table can be transferred to an application that can utilize the updated table. For example, the updated table can be transferred to a profile build to build a color profile. As described herein, a color profile can be a set of data that characterizes a color space. In one example, a color profile can describe the color attributes of a particular device or viewing specifications with a mapping between the device-dependent color space, such as a source or target color space, and a device-independent color space, such as profile connection space, and vice versa. In some examples, the profile builder can generate a color profile for a particular device. For example, the profile builder can generate an ICC color profile for a particular printing device.

Figure 4:
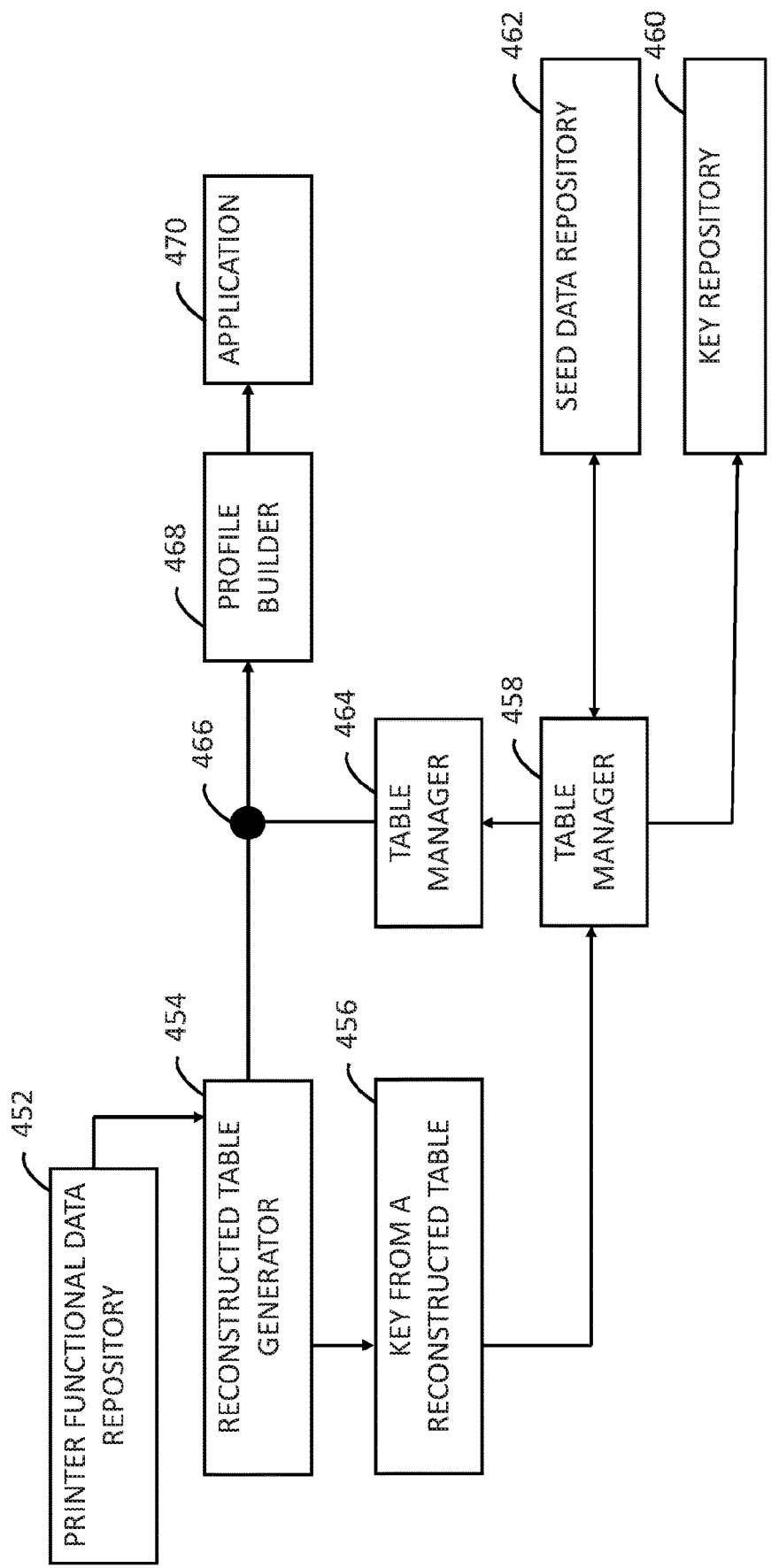
FIG. 4 illustrates a block diagram of an example of a system suitable for using corrective data for a reconstructed table consistent with the disclosure.

FIG. 4 illustrates a block diagram of an example of a system 450 suitable for using corrective data for a reconstructed table consistent with the disclosure. In some examples, the elements of the system 450 can be performed by one or more systems and/or computing devices, as described herein. For example, the system 450 can be implemented by a computing device 102 as referenced in FIG. 1 and/or the system 220 as referenced in FIG. 2.

The system 450 can include a reconstructed table generator 454 that can be utilized to decompress a compressed color plane as described herein. In some examples, the reconstructed table generator 454 can receive printer functional data (PFD) from a PFD repository 452. The PFD repository 452 can be a consumable product with PFD that corresponds to the consumable product. For example, the PFD can be part of an ink cartridge or toner cartridge utilized with a printing device. In this example, the PFD can be determined from a code on the ink cartridge or toner cartridge. Ink cartridge and toner cartridge are used as examples, but additional consumable products could also include the PFD. In some examples, the PFD can be stored in a database that can provide the PFD to the reconstructed table generator 454 based on the type of consumable product.

In some examples, the reconstructed table generator 454 can generate a plurality of reconstructed tables based on the PFD and seed data from a seed data repository 462. For example, the plurality of reconstructed tables can include a reconstructed table for each of a plurality of color planes. In this example, the plurality of reconstructed tables can include a reconstructed table for cyan, a reconstructed table for magenta, a reconstructed table for yellow, and a reconstructed table for key (black). In this example, there can be a unique PFD for each of the plurality of reconstructed tables. For example, there can be a unique PFD for cyan, a unique PFD for magenta, a unique PFD for yellow, and a unique PFD for key (black).

In some examples, the reconstructed table generated by the reconstructed table generator 454 can be a table reconstructed from a compressed color table. For example, the compressed color table can be an original color table compressed with a lossy compression at a selected compression ratio. The compressed color table can include a color difference between an original node of the color table and the corresponding reconstructed node of the lossy compressed color table that is within a selected error threshold at the selected compression ratio.

In some examples, the reconstructed color table generated by the reconstructed table generator 454 can include a quantity of errors based on the selected error threshold. In some examples, the quantity of errors can be corrected utilizing the seed data from a seed data repository 462 (e.g., bit assignment table, coefficient bit assignment table, etc.). For example, nodes of the original color table can be transformed with a compressor (e.g., lossy compressor, lossless compressor, etc.) to obtain quantized coefficients. The quantized coefficients can be reordered into a one-dimensional bitstream using a multi-dimensional reordering, such as a three-dimensional zigzag ordering. A coefficient bit assignment table can be calculated from the quantized coefficients.

The coefficient bit assignment table can be applied to the quantized coefficients to reconstruct the coefficients in decompression to generate the reconstructed color table. The quantized coefficients and the coefficient bit assignment table are stored as a bitstream on a memory device. The quantized coefficients can be reordered into a one-dimensional bitstream using a multi-dimensional reordering, such as a three-dimensional zigzag ordering, which can introduce a large amount of redundancy to the coefficient bit assignment table. The coefficient bit assignment table and the lossy compressed coefficients can be further compressed with the lossless compression that can be written to a binary file on the memory device.

Lossless compression and lossy compression are forms of data compression, which includes encoding information using fewer bits than the original representation. In lossless compression, no digital difference exists between the original data and the reconstructed compressed data. In lossy compression, a portion of the original data is lost upon reconstruction of the compressed data.

In some examples, the decompression of the lossy compressed table or generation of the reconstructed table can be utilized to generate a key that can be compared to keys of a key repository to determine if there is corrective data that corresponds to the reconstructed table. For example, has function can be performed on the reconstructed table to generate a key value that can represent a state of the reconstructed table. In this example, the state of the reconstructed table can correspond to a quantity of changes or alterations that may affect an effectiveness of the reconstructed table. For example, the PFD may be incorrect or include a number of errors. In this example, state of the reconstructed table from the PFD can include a number of errors that can be altered utilizing corrective data as described further herein.

In some examples, the system 450 can generate a key 456 from a reconstructed table generated by the reconstructed table generator 454. As described herein, the key 456 can be generated utilizing a hash function or other type of function that generates a unique identifier for the reconstructed table. In some examples, the key 456 can be utilized to determine when the reconstructed table needs alterations.

In some examples, the system 450 can include a table manager 458. In some examples, the table manager 458 can be utilized to manage the generation of reconstructed tables as described herein. In some examples, the table manager 458 can be utilized to identify a reconstructed table that needs alterations and/or identify corrective data 464 to be implanted into the identified reconstructed table. In some examples, the table manager 458 can also be utilized to provide the seed data from the seed data repository 462 to the reconstructed table generator 454.

In some examples, the table manager 458 can receive the key 456 for the reconstructed table generated by the reconstructed table generator 454. The table manager 458 can compare the generated key 456 to a plurality of keys within a key repository 460. As described herein, a key repository 460 can be a database or memory resource that includes a plurality of keys with corresponding corrective data 464 that can be applied to a particular reconstructed table generated by the reconstructed table generator 454. The unique key 456 for the reconstructed table can be compared to the plurality of keys of the key repository 460. When the unique key 456 for the reconstructed table matches a key of the key repository 460 the corresponding corrective data 464 from the key repository 460 can be utilized to alter the reconstructed table at 466. For example, the corrective data 464 can be retrieved from the key repository 460 by the table manager 458 and implemented at 466 prior to being transferred to a profile builder 468 or other type of application.

In some examples, the profile builder 468 can transfer a profile generated based on the updated reconstructed table to an application 470. In some examples, the application 470 can be executed by a printing device to generate images on print media based on a color profile generated by the profile builder 468. As described herein, a color profile can be a set of data that characterizes a color space. In one example, a color profile can describe the color attributes of a particular device or viewing specifications with a mapping between the device-dependent color space, such as a source or target color space, and a device-independent color space, such as profile connection space, and vice versa. The mappings may be specified using tables such as look up tables, to which interpolation is applied, or through a series of parameters for transformations. Printing devices and/or the application 470 (e.g., printers, monitors, televisions, operating systems, browsers, and other device and software, etc.) that capture or display color can include profiles that comprise various combinations of hardware and programming.

As used herein, "logic" is an alternative or additional processing resource to perform a particular action and/or element described herein. Logic can include hardware. The hardware can include processing resources such as circuitry, which are distinct from machine-readable instructions on a machine-readable media. Further, as used herein, "a" can refer to one such thing or more than one such thing.

The above specification, examples and data provide a description of the method and applications, and use of the system and method of the disclosure. Since many examples can be made without departing from the spirit and scope of the system and method of the disclosure, this specification merely sets forth some of the many possible example configurations and implementations.

What is claimed is:

1. A computing device, comprising:
   a processing resource; and
   a memory resource storing machine readable instructions to cause the processing resource to:
   generate a key from a reconstructed table;
   determine corrective data for the reconstructed table based on the generated key; and
   implement the corrective data to the reconstructed table to generate an updated table.

2. The computing device of claim 1, wherein the processing resource executes machine readable instructions to cause the processor to transfer the updated table to a profile builder.

3. The computing device of claim 1, wherein the processing resource executes machine readable instructions to cause the processor to generate the reconstructed table from Printer Functional Data (PFD) and printing device information.

4. The computing device of claim 1, wherein the processing resource executes machine readable instructions to cause the processor to determine when an error exists in the reconstructed table based on a comparison between the generated key and a number of keys within a key repository.

5. The computing device of claim 4, wherein the corrective data alter values of the reconstructed table when the generated key matches one of the number of keys within the key repository.

6. The computing device of claim 5, wherein the corrective data corresponds to the key of the number of keys within the key repository that matches the generated key.

7. A non-transitory machine-readable storage medium having stored thereon machine-readable instructions to cause a processing resource to:
   generate a plurality of keys from a reconstructed table;
   compare the plurality of keys to a key repository to identify a matching key for one or more of the plurality of keys from the key repository;
   determine a corrective data for the reconstructed table that correspond to the matching key; and
   implement the corrective data to the reconstructed table to generate an updated table.

8. The medium of claim 7, wherein the plurality of keys correspond to a particular plane of the reconstructed table.

9. The medium of claim 7, wherein the key repository includes a plurality of keys with corresponding corrective data to alter corresponding reconstructed tables that generate a matching key.

10. The medium of claim 7, comprising instructions to cause the processing resource to:
    identify a first set of keys for the reconstructed table for a first mode;
    identify a second set of keys for the reconstructed table for a second mode; and
    compare each of the first set of keys and the second set of keys to the plurality of keys from the key repository.

11. The medium of claim 10, wherein the first set of keys correspond to corrective data for the reconstructed table when a printing device is in the first mode and the second set of keys correspond to corrective data for the reconstructed table when the printing device is in the second mode.

12. The medium of claim 7, comprising instructions to cause the processing resource to refrain from implementing corrective data to the reconstructed table when the plurality of keys from the reconstructed table do not match one or more of the plurality of keys from the key repository.

13. A method, comprising:
    generating a plurality of keys from a reconstructed table to represent a corresponding plurality of planes of the reconstructed table;
    comparing the plurality of keys to a key repository to identify if a matching key exists for one or more of the plurality of keys from the key repository;
    transferring, when the matching key does not exist, the reconstructed table to a profile builder;
    determining, when the matching key exists, corrective data for the reconstructed table that correspond to a matching key within the key repository;
    implementing, when the matching key exists, the corrective data to the reconstructed table to generate an updated table; and transferring, when the matching key exists, the updated table that includes a plurality of values altered by the corrective data table to the profile builder.

14. The method of claim 13, wherein generating the plurality of keys from the reconstructed table includes utilizing a hash function on the values of the reconstructed table to generate a hashed reconstructed table.

15. The method of claim 13, wherein the key repository includes a plurality of key values that correspond to hashed reconstructed tables to be altered by corresponding corrective data.

* * * * *